(12) United States Patent
Tan et al.

(10) Patent No.: US 11,913,594 B2
(45) Date of Patent: Feb. 27, 2024

(54) MOUNTING BRACKET AND MOTOR INCLUDING SAME

(71) Applicant: CHINA LEADSHINE TECHNOLOGY CO., LTD., Guangdong (CN)

(72) Inventors: Caisheng Tan, Guangdong (CN); Congcong Fu, Guangdong (CN); Jiejian Huang, Guangdong (CN)

(73) Assignee: CHINA LEADSHINE TECHNOLOGY CO., LTD., Shenzhen (CN)

( * ) Notice: Subject to any disclaimer, the term of this patent is extended or adjusted under 35 U.S.C. 154(b) by 0 days.

(21) Appl. No.: 17/870,288

(22) Filed: Jul. 21, 2022

(65) Prior Publication Data

US 2023/0022314 A1 Jan. 26, 2023

(30) Foreign Application Priority Data

Jul. 21, 2021 (CN) .......................... 202110826434.7

(51) Int. Cl.
*H02K 7/116* (2006.01)
*F16M 1/04* (2006.01)
*F16M 13/02* (2006.01)

(52) U.S. Cl.
CPC .............. *F16M 1/04* (2013.01); *F16M 13/02* (2013.01)

(58) Field of Classification Search
CPC .......... F16M 1/04; F16M 13/02; H02K 11/21; H02K 5/00; H02K 5/225; H02K 5/04; H02K 5/16

See application file for complete search history.

(56) References Cited

U.S. PATENT DOCUMENTS

| 2020/0067386 | A1* | 2/2020 | Wang | ................. G01D 5/24442 |
| 2022/0393543 | A1* | 12/2022 | Goykhman | .............. H02K 5/04 |
| 2023/0056326 | A1* | 2/2023 | Nishimoto | ............. H02K 11/33 |

* cited by examiner

*Primary Examiner* — Amy J. Sterling
(74) *Attorney, Agent, or Firm* — Lei Fang; Smith Tempel Blaha LLC

(57) ABSTRACT

A mounting bracket and motor including same have mounting bracket arranged on side of the motor's casing away from front end cover, and includes bracket body. A bearing mounting portion for mounting motor's bearing is on bracket body's side close to casing; and protective cover and at least one of protective cover mounting portion and encoder bracket mounting portion on bracket body's side away from casing. Protective cover mounting portion is configured to fixedly connect bracket body and protective cover. Accommodation space for accommodating encoder is defined between bracket body and protective cover; or encoder bracket mounting portion includes first encoder bracket mounting portion, and first encoder bracket mounting portion is fixedly connected to protective cover by encoder bracket. Accommodation space for accommodating encoder is defined between encoder bracket and protective cover, to resolve weak protection problems for encoder during mounting, large motor's overall volume motor, and high motor costs.

10 Claims, 10 Drawing Sheets

MOUNTING BRACKET AND MOTOR INCLUDING SAME

CROSS REFERENCE TO RELATED APPLICATIONS

The present application claims priority from Chinese Patent Application No. 202110826434.7 filed Jun. 21, 2021, all of which are hereby incorporated herein by reference.

TECHNICAL FIELD

The present disclosure relates to the field of motor technologies, and specifically, to a mounting bracket and a motor including the same.

BACKGROUND

With the continuous development of the intelligent equipment industry, mechanical equipments are developing toward smaller volume while ensuring the requirements of use. Accordingly, the volume of a motor used in the equipment also needs to be reduced as much as possible.

In the prior art, an encoder is mounted outside a rear end cover of the motor and has problems of weak protection for the encoder during mounting, large overall volume of the motor, and high motor costs.

SUMMARY

A main objective of the present disclosure is to provide a mounting bracket and a motor including the same, to resolve the problems of weak protection for the encoder during mounting, large overall volume of the motor, and high motor costs in the prior art.

To achieve the foregoing objective, according to an aspect of the present disclosure, a mounting bracket is provided, arranged on a side of a casing of a motor away from a front end cover, the mounting bracket including: a bracket body, where a bearing mounting portion for mounting a bearing of the motor is arranged on a side of the bracket body close to the casing; and a protective cover and at least one of a protective cover mounting portion and an encoder bracket mounting portion are arranged on a side of the bracket body away from the casing; and where the protective cover mounting portion is configured to fixedly connect the bracket body and the protective cover, so that an accommodation space for accommodating an encoder is defined between the bracket body and the protective cover; or the encoder bracket mounting portion includes a first encoder bracket mounting portion, and the first encoder bracket mounting portion is fixedly connected to the protective cover by an encoder bracket, so that the accommodation space for accommodating the encoder is defined between the encoder bracket and the protective cover.

Further, the accommodation space includes: a first accommodation cavity, where the first accommodation cavity is provided on the bracket body and located on a side of the bracket body close to the protective cover, and an opening of the first accommodation cavity faces toward the protective cover; or a second accommodation cavity, where the second accommodation cavity is provided on the protective cover and located on a side of the protective cover close to the bracket body, and an opening of the second accommodation cavity faces toward the bracket body; or a third accommodation cavity, where the third accommodation cavity is provided on the encoder bracket and located on a side of the encoder bracket close to the protective cover, and an opening of the third accommodation cavity faces toward the protective cover; or a fourth accommodation cavity, where the fourth accommodation cavity is provided on the protective cover and located on a side of the protective cover close to the encoder bracket, and an opening of the fourth accommodation cavity faces toward the encoder bracket.

Further, the bracket body includes a bottom plate; or the bracket body includes a bottom plate and a side wall portion at least partially surrounding the bottom plate, and the bottom plate is perpendicular to an axis of the motor, where a height L1 of the side wall portion between the bottom plate and the protective cover is greater than 0, and/or a height L2 of the side wall portion between the casing and the bottom plate is greater than or equal to 0.

Further, the encoder bracket is arranged on the bottom plate, and the encoder bracket and the bottom plate are integrally formed; or a second encoder bracket mounting portion is arranged on the bottom plate, and the encoder bracket and the bottom plate are detachably connected by the second encoder bracket mounting portion.

Further, at least one first through hole is provided on the side wall portion, and a center line of the at least one first through hole is perpendicular to the axis of the motor, and/or the first through hole faces toward a mounting hole on a side wall of the encoder bracket to communicate with the mounting hole, for leading out a cable of the motor or fastening the encoder or adjusting the encoder.

Further, a second through hole running through the bottom plate is provided on the bottom plate, where the second through hole is provided close to the side wall portion, and the second through hole is configured for at least one of an encoder cable, a winding cable, or a brake cable to pass through.

Further, a placement groove for placing a cable of a brake of the motor is provided on a side of the bottom plate close to the protective cover; and the second through hole is spaced apart from the placement groove, or the second through hole communicates with the placement groove, and a part of the cable of the brake of the motor is passed through the second through hole and placed in the placement groove.

Further, at least one adhesive injection hole for adhesive injection is provided on the bottom plate, and the adhesive injection hole communicates with a bearing mounting hole of the bearing mounting portion, for injecting an adhesive into the bearing mounting hole; and/or a motor mounting portion is arranged on the side of the bracket body close to the casing, and the body of the motor and the bracket body are fixedly connected by the motor mounting portion; and/or a brake mounting portion is arranged on the side of the bracket body close to the casing, and a brake and the bracket body are fixedly connected by the brake mounting portion.

Further, at least one groove is provided on a surface of a side of the bottom plate away from the protective cover, where the at least one groove is between the bearing mounting portion and an outer circumferential surface of the bottom plate.

Further, the bearing mounting portion includes: a bearing mounting hole and an adhesive storage groove, where the adhesive storage groove is located on an inner side wall of the bearing mounting hole.

According to another aspect of the present disclosure, a motor is provided, including: a casing and a front end cover and a mounting bracket respectively located at two opposing ends of the casing, where the mounting bracket is the foregoing mounting bracket; and where the casing and the front end cover are integrally formed or detachably connected.

According to the technical solution of the present disclosure, a mounting bracket arranged on a side of a casing of a motor away from a front end cover in the present disclosure includes: a bracket body, where a bearing mounting portion for mounting a bearing of the motor is arranged on a side of the bracket body close to the casing; and a protective cover and at least one of a protective cover mounting portion and an encoder bracket mounting portion are arranged on a side of the bracket body away from the casing; and where the protective cover mounting portion is configured to fixedly connect the bracket body and the protective cover, so that an accommodation space for accommodating an encoder is defined between the bracket body and the protective cover; or the encoder bracket mounting portion includes a first encoder bracket mounting portion, and the first encoder bracket mounting portion is fixedly connected to the protective cover by an encoder bracket, so that the accommodation space for accommodating the encoder is defined between the encoder bracket and the protective cover. In this way, by the arrangement of the mounting bracket, both the bearing of the motor and the encoder bracket with the encoder can be mounted, and the encoder is mounted in the accommodation space of the mounting bracket of the motor, thereby resolving the problems of weak protection for the encoder during mounting, large overall volume of the motor, and high motor costs in the prior art.

BRIEF DESCRIPTION OF THE DRAWINGS

The accompanying drawings constituting a part of the present disclosure are used for providing further understanding for the present disclosure. Exemplary embodiments of the present disclosure and descriptions thereof are used for explaining the present disclosure and do not constitute any inappropriate limitation to the present disclosure. In the accompanying drawings.

Figure 1:
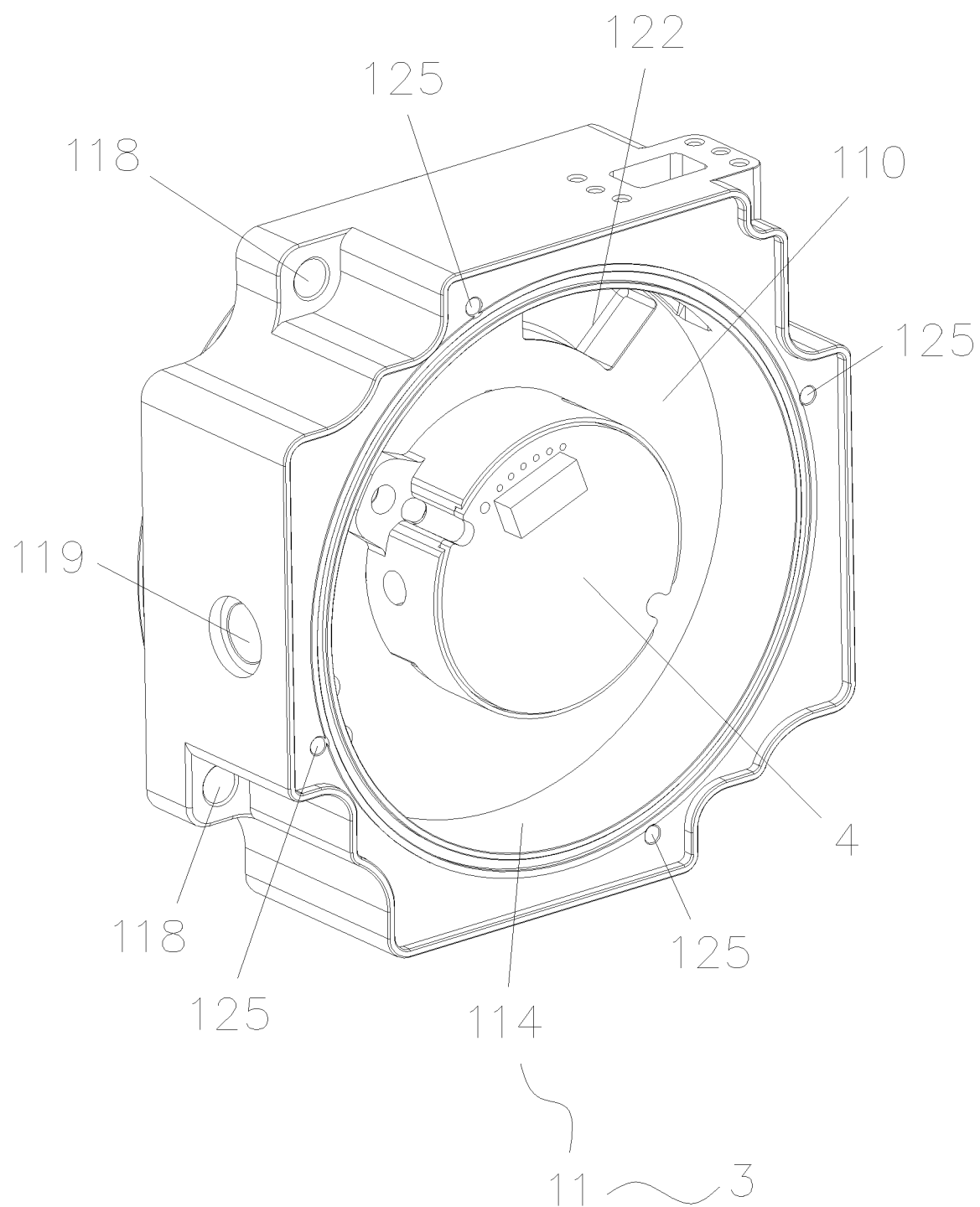
FIG. 1 is a schematic structural diagram of a bracket body according to an embodiment of a mounting bracket of the present disclosure in a first direction when an encoder is mounted on the bracket body.
Figure 2:
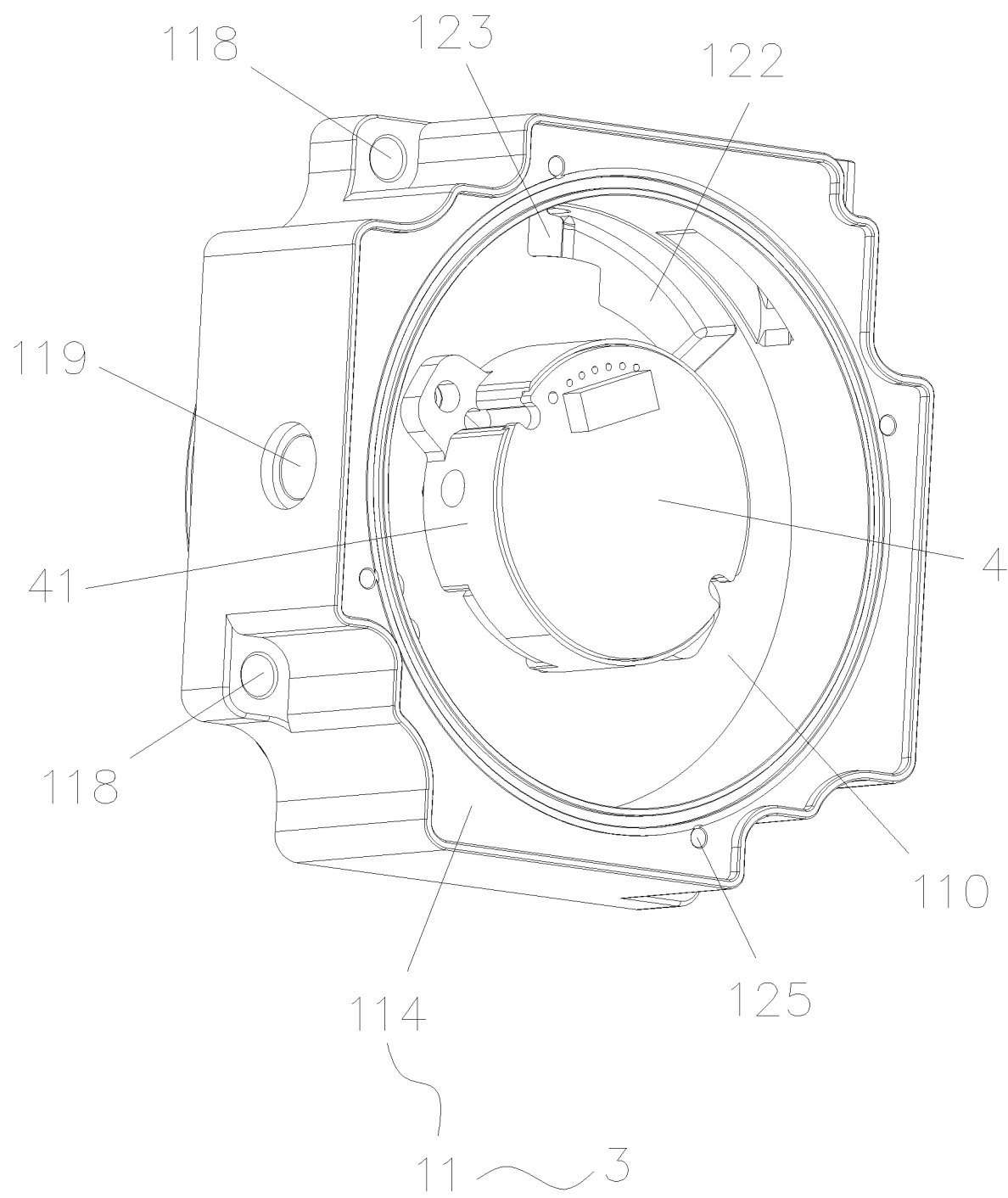
FIG. 2 is a schematic structural diagram of the bracket body shown in FIG. 1 in a second direction when an encoder is mounted on the bracket body.
Figure 3:
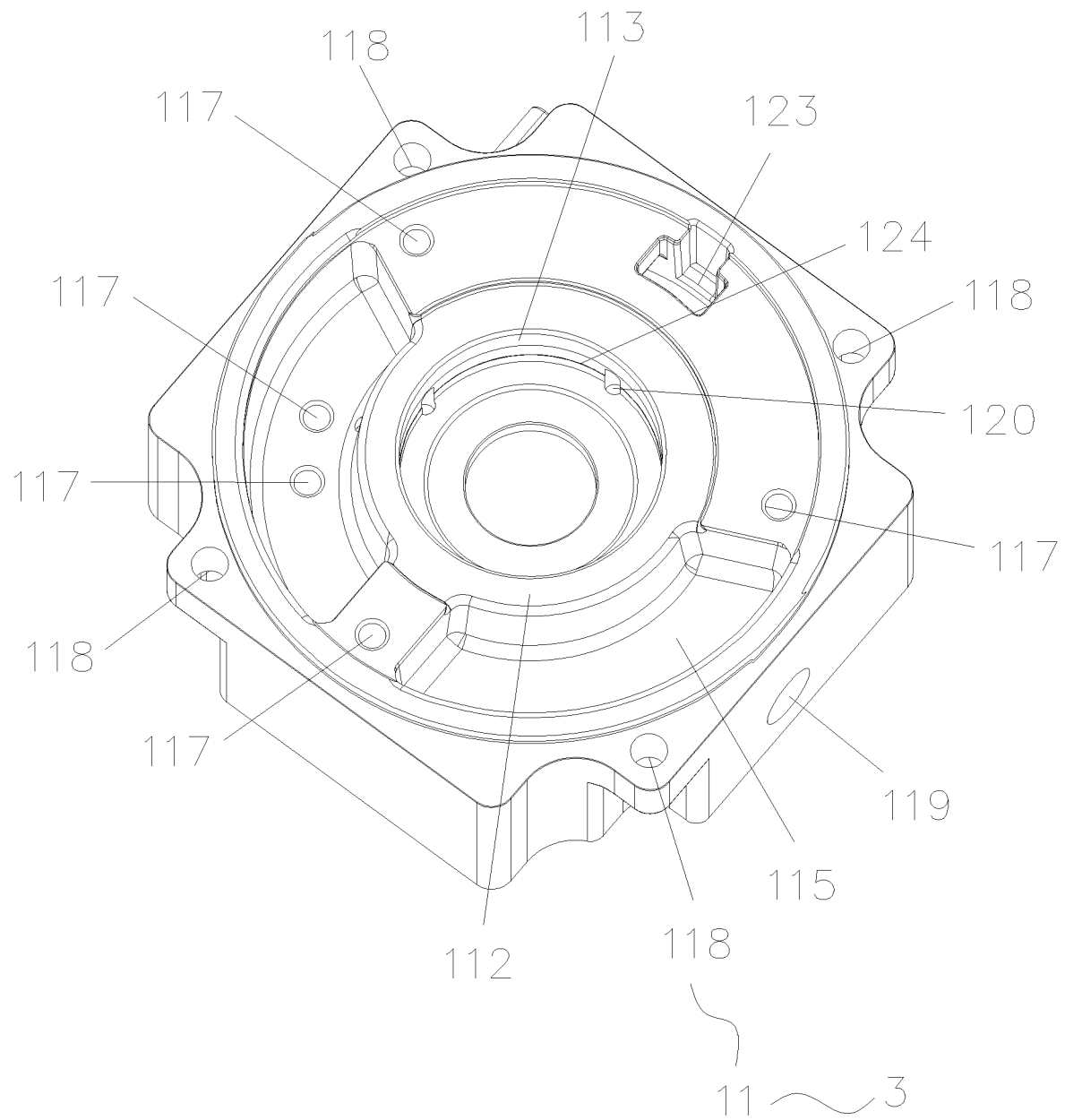
FIG. 3 is a schematic structural diagram of the bracket body shown in FIG. 1 in a third direction when an encoder is mounted on the bracket body.
Figure 4:
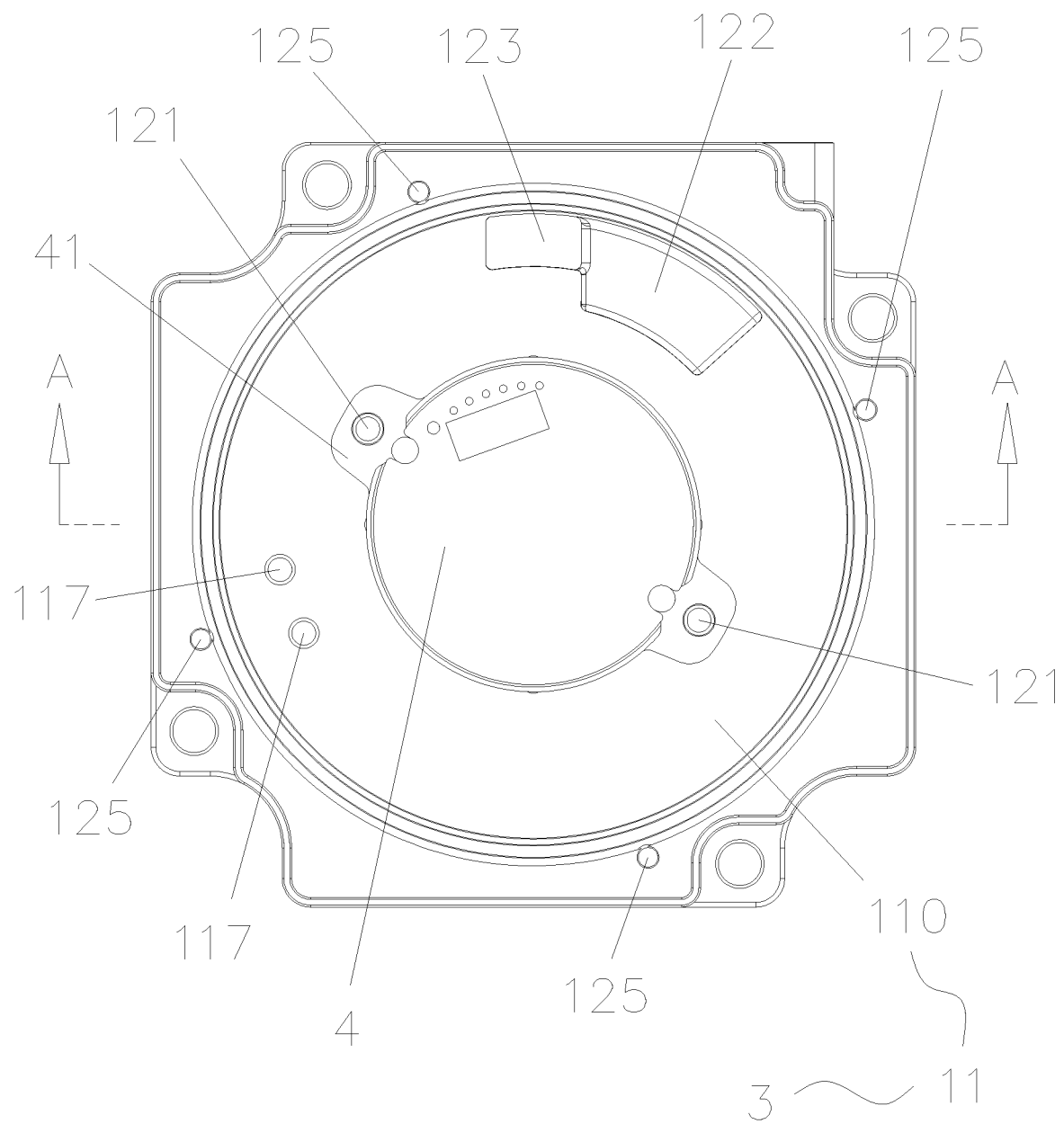
FIG. 4 is a side view of the bracket body shown in FIG. 1 when an encoder is mounted on the bracket body.
Figure 5:
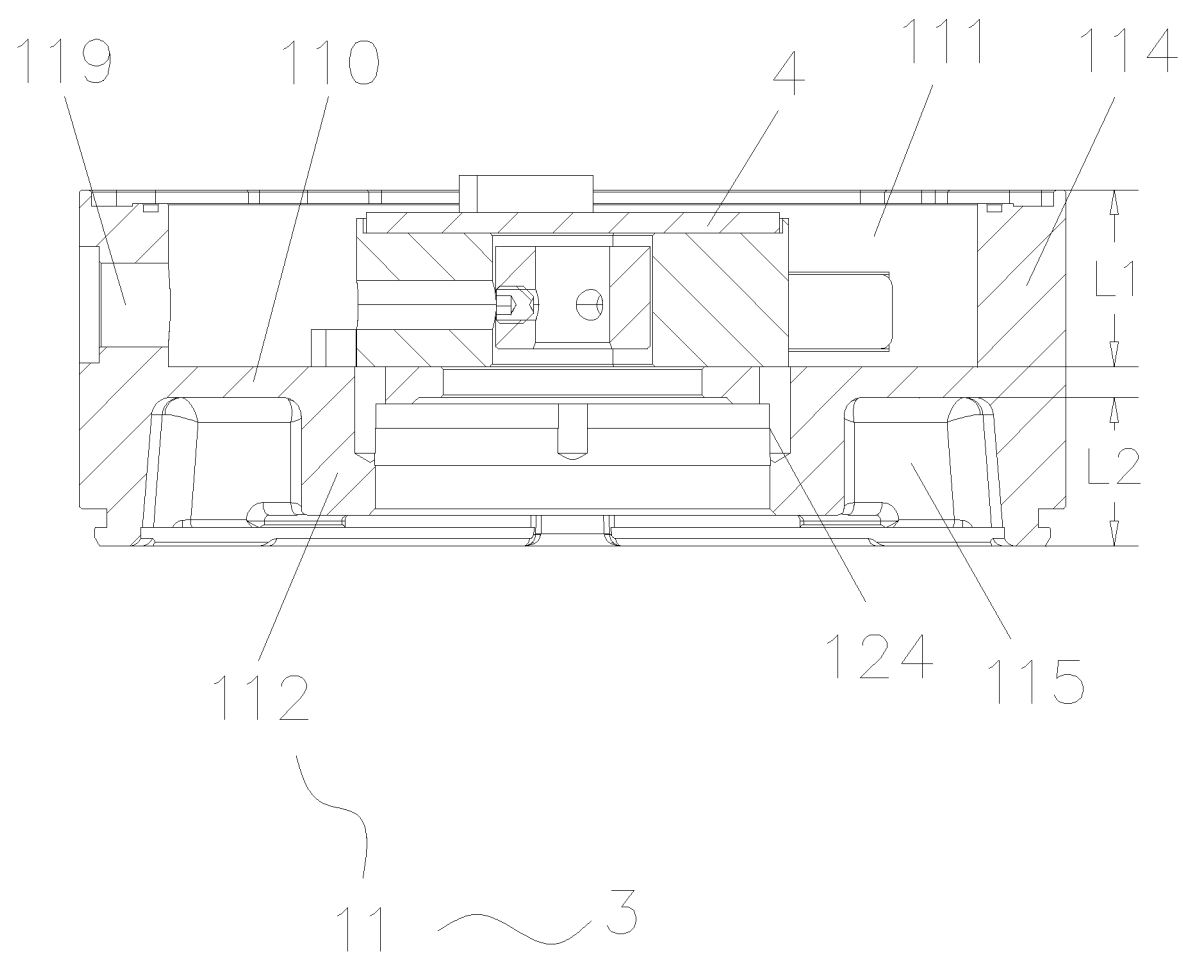
FIG. 5 is a cross-sectional view of the bracket body shown in FIG. 4 along an A-A direction when an encoder is mounted on the bracket body.
Figure 6:
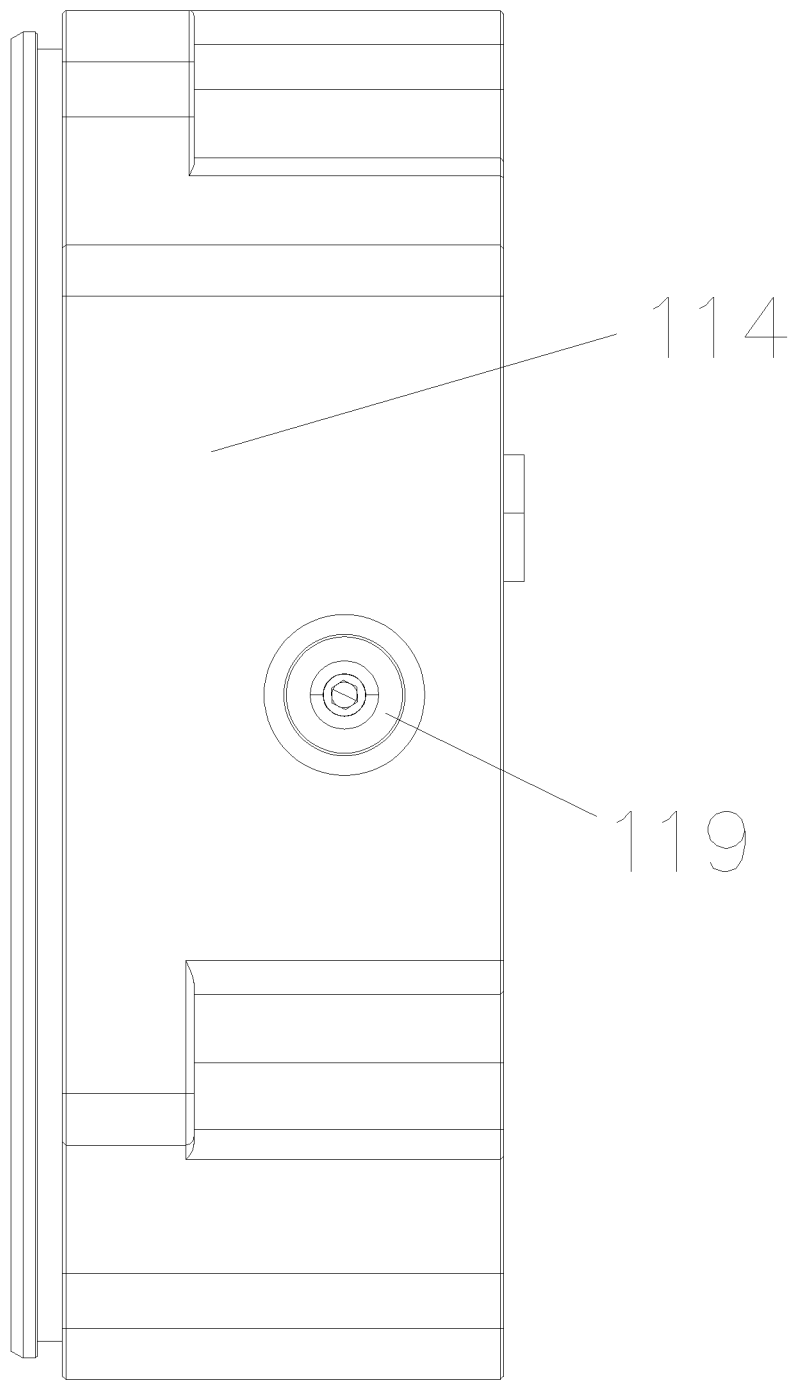
FIG. 6 is a front view of the bracket body shown in FIG. 1 when an encoder is mounted on the bracket body.
Figure 7:
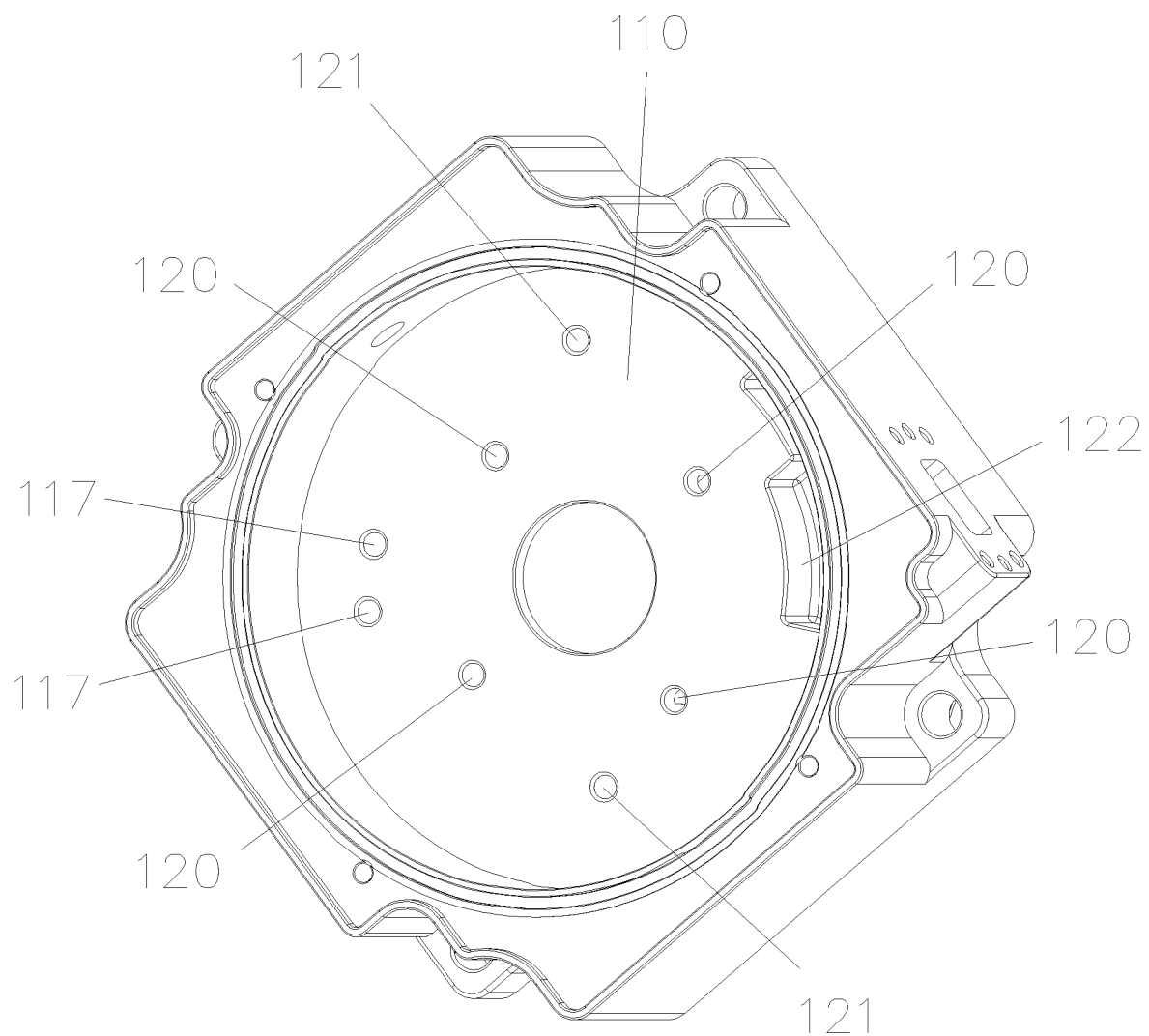
FIG. 7 is a schematic structural diagram of the bracket body shown in FIG. 1 when no encoder is mounted on the bracket body.

The accompanying drawings include the following reference numerals:

1000. Motor; 100. Casing assembly; 1. Casing; 2. Front end cover; 3. Mounting bracket; 4. Encoder; 41. Encoder bracket; 5. Rotation shaft; 6. Bearing; 11. Bracket body; 12. Protective cover; 110. Bottom plate; 111. Accommodation space; 112. Bearing mounting portion; 113. Bearing mounting hole; 114. Side wall portion; 115. Groove; 117. Brake mounting portion; 118. Motor mounting portion; 119. First through hole; 120. Adhesive injection hole; 121. Second encoder bracket mounting portion; 122. Placement groove; 123. Second through hole; 124. Adhesive storage groove; 125. Protective cover mounting portion.

DETAILED DESCRIPTION

It should be noted that the embodiments in the present disclosure and the features in the embodiments may be combined with each other in case of no conflicts. The present disclosure is described in detail below with reference to the accompanying drawings and the embodiments.

As shown in FIG. 1 to FIG. 7, the present disclosure provides a mounting bracket, arranged on a side of a casing 1 of a motor 1000 away from a front end cover 2, the mounting bracket including: a bracket body 11, where a bearing mounting portion 112 for mounting a bearing 6 of the motor 1000 is arranged on a side of the bracket body 11 close to the casing 1; and a protective cover 12 and at least one of a protective cover mounting portion 125 and an encoder bracket mounting portion are arranged on a side of the bracket body 11 away from the casing 1; and where the protective cover mounting portion 125 is configured to fixedly connect the bracket body 11 and the protective cover 12, so that an accommodation space 111 for accommodating an encoder 4 is defined between the bracket body 11 and the protective cover 12; or the encoder bracket mounting portion includes a first encoder bracket mounting portion, and the first encoder bracket mounting portion is fixedly connected to the protective cover 12 by an encoder bracket 41, so that the accommodation space 111 for accommodating the encoder 4 is defined between the encoder bracket 41 and the protective cover 12.

The mounting bracket arranged on a side of the casing 1 of the motor 1000 away from the front end cover 2 in the present disclosure includes: a bracket body 11, where a bearing mounting portion 112 for mounting a bearing 6 of the motor 1000 is arranged on a side of the bracket body 11 close to the casing 1; and a protective cover 12 and at least one of a protective cover mounting portion 125 and an encoder bracket mounting portion are arranged on a side of the bracket body 11 away from the casing 1; and where the protective cover mounting portion 125 is configured to fixedly connect the bracket body 11 and the protective cover 12, so that an accommodation space 111 for accommodating an encoder 4 is defined between the bracket body 11 and the protective cover 12; or the encoder bracket mounting portion includes a first encoder bracket mounting portion, and the first encoder bracket mounting portion is fixedly connected to the protective cover 12 by an encoder bracket 41, so that the accommodation space 111 for accommodating the encoder 4 is defined between the encoder bracket 41 and the protective cover 12. In this way, by the arrangement of the mounting bracket, both the bearing 6 of the motor 1000 and the encoder bracket with the encoder can be mounted, and the encoder is mounted in the accommodation space of the mounting bracket of the motor, thereby resolving the problems of weak protection for the encoder during mounting, large overall volume of the motor, and high motor costs in the prior art.

Specific embodiments of the mounting bracket in the present disclosure are as follows:

Embodiment 1

A mounting bracket in this embodiment includes: a bracket body 11, where a bearing mounting portion 112 for mounting a bearing 6 of the motor 1000 is arranged on a side of the bracket body 11 close to the casing 1; and a protective cover 12 and a protective cover mounting portion 125 are arranged on a side of the bracket body 11 away from the casing 1; and where the protective cover mounting portion 125 is configured to fixedly connect the bracket body 11 and the protective cover 12, so that an accommodation space 111 for accommodating an encoder 4 is defined between the bracket body 11 and the protective cover 12.

Specifically, the protective cover 12 is connected to the bracket body 11 by the protective cover mounting portion 125 arranged on the bracket body 11, and the accommodation space 111 is defined between the bracket body 11 and the protective cover 12, to be configured to accommodate the encoder 4, where the encoder 4 is located in the accommodation space 111. The encoder 4 is directly mounted in the accommodation space 111; or the encoder 4 is mounted on the encoder bracket 41, and the encoder bracket 41 is mounted in the accommodation space 111.

Embodiment 2

A difference between this embodiment and Embodiment 1 lies in the specific position of the accommodation space 111. The mounting bracket in this embodiment includes: a bracket body 11, where a bearing mounting portion 112 for mounting a bearing 6 of the motor 1000 is arranged on a side of the bracket body 11 close to the casing 1; and a protective cover 12 and an encoder bracket mounting portion are arranged on a side of the bracket body 11 away from the casing 1, where the encoder bracket mounting portion includes a first encoder bracket mounting portion, and the first encoder bracket mounting portion is fixedly connected to the protective cover 12 by an encoder bracket 41, so that the accommodation space 111 for accommodating the encoder 4 is defined between the encoder bracket 41 and the protective cover 12.

The bracket body 11 is connected to the encoder bracket 41 by the first encoder bracket mounting portion arranged on the bracket body 11. The encoder bracket 41 is between the protective cover 12 and the bracket body 11. An accommodation space 111 is defined between the encoder bracket 41 and the protective cover 12, to be configured to accommodate the encoder 4.

Specifically, a protective cover mounting hole is provided on an outer circumferential surface of the encoder bracket 41, and a part of the protective cover 12 is sleeved on the outer circumferential surface of the encoder bracket 41, to be connected to the protective cover mounting hole by a fastener.

Embodiment 3

This embodiment is a further limitation on Embodiment 1. The accommodation space 111 of the mounting bracket in this embodiment includes: a first accommodation cavity, where the first accommodation cavity is provided on the bracket body 11 and located on a side of the bracket body 11 close to the protective cover 12, and an opening of the first accommodation cavity faces toward the protective cover 12.

Embodiment 4

This embodiment is a further limitation on Embodiment 1, and a difference between this embodiment and Embodiment 3 lies in the specific position of the accommodation space 111. The accommodation space 111 of the mounting bracket in this embodiment includes: a second accommodation cavity, where the second accommodation cavity is provided on the protective cover 12 and located on a side of the protective cover 12 close to the bracket body 11, and an opening of the second accommodation cavity faces toward the bracket body 11.

Embodiment 5

This embodiment is a further limitation on Embodiment 2. The accommodation space 111 of the mounting bracket in this embodiment includes: a third accommodation cavity, where the third accommodation cavity is provided on the encoder bracket 41 and located on a side of the encoder bracket 41 close to the protective cover 12, and an opening of the third accommodation cavity faces toward the protective cover 12.

Embodiment 6

This embodiment is a further limitation on Embodiment 2, and a difference between this embodiment and Embodiment 5 lies in the specific position of the accommodation space 111. The accommodation space 111 of the mounting bracket in this embodiment includes: a fourth accommodation cavity, where the fourth accommodation cavity is provided on the protective cover 12 and located on a side of the protective cover 12 close to the encoder bracket 41, and an opening of the fourth accommodation cavity faces toward the encoder bracket 41.

Embodiment 7

This embodiment is a further limitation on Embodiment 1. The bracket body 11 in this embodiment includes a bottom plate 110, and the protective cover mounting portion 125 is a protective cover mounting hole provided on the bottom plate 110. An end of a fastener is passed through the protective cover 12 and tightened in the protective cover mounting hole, to connect the protective cover 12 and the bottom plate 110 of the bracket body 11.

Embodiment 8

This embodiment is a further limitation on Embodiment 1, and a difference between this embodiment and Embodiment 7 lies in the specific structure of the protective cover mounting portion 125.

Specifically, the bracket body 11 in this embodiment includes a bottom plate 110 and a side wall portion 114 at least partially surrounding the bottom plate 110, and the bottom plate 110 is perpendicular to an axis of the motor 1000, where the protective cover mounting portion 125 is the side wall portion 114 and a protective cover mounting hole provided on the side wall portion 114. An end of a fastener is passed through the protective cover 12 and tightened in the protective cover mounting hole, to connect the protective cover 12 and the side wall portion 114 of the bracket body 11.

Optionally, the protective cover mounting portion 125 is the side wall portion 114 and a clamping member arranged on the side wall portion 114. An end of the clamping member is clamped on the protective cover, to connect the protective cover 12 and the side wall portion 114 of the bracket body 11.

Optionally, the protective cover mounting portion 125 is the side wall portion 114 and a protective cover mounting hole provided on the side wall portion 114, and a clamping member is arranged at a corresponding position of the protective cover facing toward the side wall portion 114. An end of the clamping member is clamped in the protective cover mounting hole, to connect the protective cover 12 and the side wall portion 114 of the bracket body 11.

Embodiment 9

This embodiment is a further limitation on Embodiment 8. In this embodiment, a height L1 of the side wall portion 114 between the bottom plate 110 and the protective cover 12 is greater than 0, that is, a distance between an end of the side wall portion 114 close to the protective cover 12 and a side of the bottom plate 110 close to the protective cover 12 is greater than 0.

Embodiment 10

This embodiment is a further limitation on Embodiment 8 or 9. In this embodiment, a height L2 of the side wall portion 114 between the casing 1 and the bottom plate 110 is greater than 0, that is, a distance between an end of the side wall portion 114 close to the casing 1 and a side of the bottom plate 110 close to the casing 1 is greater than 0.

Embodiment 11

This embodiment is a further limitation on Embodiment 8 or 9, and a difference between this embodiment and Embodiment 10 lies in the height of the side wall portion 114. In this embodiment, a height L2 of the side wall portion 114 between the casing 1 and the bottom plate 110 is equal to 0, that is, an end of the side wall portion 114 close to the casing 1 is flush with a side of the bottom plate 110 close to the casing 1.

Embodiment 12

This embodiment is a further limitation on at least one of Embodiments 7 to 10. The encoder bracket 41 is arranged on the bottom plate 110 in this embodiment, and the encoder bracket 41 and the bottom plate 110 are integrally formed.

Embodiment 13

This embodiment is a further limitation on at least one of Embodiments 7 to 11, and a difference between this embodiment and Embodiment 12 lies in the connection relationship between the encoder bracket 41 and the bottom plate 110. A second encoder bracket mounting portion 121 is arranged on the bottom plate 110 in this embodiment, and the encoder bracket 41 and the bottom plate 110 are detachably connected by the second encoder bracket mounting portion 121.

Specifically, the second encoder bracket mounting portion 121 is a second encoder bracket mounting hole provided on the bottom plate 110, and an end of a fastener is passed through the encoder bracket 41 and tightened in the second encoder bracket mounting hole, to connect the encoder bracket 41 to the bottom plate 110. Preferably, the quantity of second encoder bracket mounting holes is greater than or equal to two.

Optionally, the second encoder bracket mounting portion 121 is a second encoder bracket mounting hole provided on the bottom plate 110, and a mounting stud matched with the second encoder bracket mounting hole is arranged on the encoder bracket 41. The mounting stud extends into the second encoder bracket mounting hole to form a tight fit, to connect the encoder bracket 41 to the bottom plate 110.

Optionally, the second encoder bracket mounting portion 121 is a second encoder bracket mounting stud provided on the bottom plate 110, and a mounting hole matched with the second encoder bracket mounting stud is arranged on the encoder bracket 41. The second encoder bracket mounting stud extends into the mounting hole to form a tight fit, to connect the encoder bracket 41 to the bottom plate 110.

Embodiment 14

This embodiment is a further limitation on Embodiment 9. At least one first through hole 119 is provided on the side wall portion 114 in this embodiment, and a center line of the at least one first through hole 119 is perpendicular to the axis of the motor 1000, for leading out a cable of the motor 1000 or fastening the encoder or adjusting the encoder 4.

Embodiment 15

This embodiment is a further limitation on Embodiment 9, and a difference between this embodiment and Embodiment 14 lies in the specific arrangement of the first through hole 119.

Specifically, a plurality of first through holes 119 are provided on the side wall portion 114 in this embodiment, where a center line of at least one first through hole 119 is perpendicular to the axis of the motor 1000, and the at least one first through hole 119 faces toward a mounting hole on a side wall of the encoder bracket 41 to communicate with the mounting hole, for leading out a cable of the motor 1000 or fastening the encoder or adjusting the encoder 4.

Optionally, a plurality of first through holes 119 are provided on the side wall portion 114 in this embodiment, where a center line of at least one first through hole 119 and an axis of the at least one mounting hole on a side wall of the encoder bracket 41 intersect at an end surface of the encoder bracket 41 facing toward the side wall portion 114, for communicating with the mounting hole, for leading out a cable of the motor 1000 or fastening the encoder or adjusting the encoder 4.

Optionally, a plurality of first through holes 119 are provided on the side wall portion 114 in this embodiment, where a center line of at least one first through hole 119 and an axis of the at least one mounting hole on a side wall of the encoder bracket 41 are coaxially arranged and perpendicular to the axis of the motor 1000, for communicating with the mounting hole, for leading out a cable of the motor 1000 or fastening the encoder or adjusting the encoder 4.

Optionally, a plurality of first through holes 119 are provided on the side wall portion 114 in this embodiment, where at least one first through hole 119 is coaxially arranged with both at least one mounting hole on a side wall of the encoder bracket 41 and at least one through hole provided on a side wall of a code disk support inside the encoder bracket, to communicate with the at least one mounting hole on the side wall of the encoder bracket 41 and the at least one through hole on the side wall of the code disk support, to be used to fasten the encoder or adjust the encoder 4.

Embodiment 16

This embodiment is a further limitation on at least one of Embodiments 7 to 10. A second through hole 123 running through the bottom plate 110 is provided on the bottom plate 110 in this embodiment, where the second through hole 123 is provided close to the side wall portion 114, and the second through hole 123 is configured for at least one of an encoder cable, a winding cable, or a brake cable to pass through.

Optionally, a first outlet hole and a second outlet hole are provided on the casing of the motor, where the first outlet hole is used for the brake cable to pass through, and the second outlet hole is used for a stator winding cable of the motor to pass through; and the second through hole 123 is provided at a position close to the first outlet hole. It should be noted herein that the second through hole 123 being provided at a position close to the first outlet hole means that the second through hole 123 is closer to the first outlet hole relative to the second outlet hole. Such an arrangement is for the purpose of shortening the connection path of the cable, so that the second through hole 123 is as close as possible to the pass-through hole of the brake cable.

Optionally, a third outlet hole is provided on the casing of the motor, where the third outlet hole is used for the brake cable and the stator winding cable of the motor to pass through, and the second through hole 123 is provided at a position close to the third outlet hole. Such an arrangement is for the purpose of shortening the connection path of the cable, so that the second through hole 123 is as close as possible to the pass-through hole of the brake cable.

Embodiment 17

This embodiment is a further limitation on Embodiment 16. In this embodiment, a placement groove 122 for placing a cable of a brake of the motor 1000 is provided on a side of the bottom plate 110 close to the protective cover 12; and the second through hole 123 is spaced apart from the placement groove 122, or the second through hole 123 communicates with the placement groove 122, and a part of the cable of the brake of the motor 1000 is passed through the second through hole 123 and placed in the placement groove 122.

Specifically, the second through hole 123 is provided on a groove bottom surface of the placement groove 122. In this way, after passing through the second through hole 123, the cable directly passes into the placement groove 122, and the cable does not need to be pulled between the second through hole 123 and the placement groove 122.

Optionally, the second through hole 123 is partially provided on the groove bottom surface of the placement groove 122. In this way, the second through hole 123 does not occupy excessive space of the placement groove 122, giving the placement groove 122 a larger accommodation space; and the cable can be directly placed in the placement groove 122 after passing through the second through hole 123.

Optionally, the second through hole 123 is provided on a side of the placement groove 122, and the hole wall of the second through hole 123 is tangent to or spaced apart from the groove wall of the placement groove 122. In this way, the placement space of the placement groove 122 is further increased, and an aperture of the second through hole 123 is not limited by the placement groove 122, which is more convenient for the cable to pass out.

Embodiment 18

This embodiment is a further limitation on at least one of Embodiments 7 to 10. At least one adhesive injection hole 120 for adhesive injection is provided on the bottom plate 110 in this embodiment, and the adhesive injection hole 120 communicates with a bearing mounting hole 113 of the bearing mounting portion 112, for injecting an adhesive into the bearing mounting hole 113.

Preferably, there are four adhesive injection holes 120, and the four adhesive injection holes 120 are evenly distributed surrounding an axis of a rotation shaft 5 of the motor 1000.

Optionally, an end surface at a side of the bracket body 11 away from the body of the motor is a first end surface, and an end surface at a side of the bracket body 11 close to the body of the motor is a second end surface. When there is one adhesive injection hole 120, the adhesive injection hole 120 extends from the first end surface to the hole wall of the bearing mounting hole along the axial direction of the motor.

Optionally, an end surface at a side of the bracket body 11 away from the body of the motor is a first end surface, and an end surface at a side of the bracket body 11 close to the body of the motor is a second end surface. When there are a plurality of adhesive injection holes 120, the adhesive injection holes 120 all extend from the first end surface to the hole wall of the bearing mounting hole along the axial direction of the motor.

Embodiment 19

This embodiment is a further limitation on at least one of Embodiments 7 to 10. In this embodiment, a motor mounting portion 118 is arranged on the side of the bracket body 11 close to the casing 1, where the body of the motor 1000 and the bracket body 11 are fixedly connected by the motor mounting portion 118.

Specifically, the motor mounting portion 118 is a motor mounting hole, and a bolt hole corresponding to the motor mounting hole is provided on the casing 1 of the motor 1000. A fastener is passed through the motor mounting hole and tightened in the bolt hole on the casing 1, to connect the bracket body 11 to the casing 1.

Preferably, there are four motor mounting holes.

Optionally, the motor mounting hole is provided on the bottom plate 110 or the side wall portion 114.

Embodiment 20

This embodiment is a further limitation on at least one of Embodiments 7 to 10. In this embodiment, a brake mounting portion 117 is arranged on the side of the bracket body 11 close to the casing 1, where a brake and the bracket body 11 are fixedly connected by the brake mounting portion 117.

Specifically, the brake mounting portion 117 is a brake mounting hole, and a fastener is passed through the brake and tightened in the brake mounting hole, to connect the bracket body 11 to the brake.

Preferably, there are a plurality of brake mounting holes.

Optionally, the brake mounting hole is provided on the bottom plate 110.

Embodiment 21

This embodiment is a further limitation on at least one of Embodiments 7 to 10.

At least one adhesive injection hole 120 for adhesive injection is provided on the bottom plate 110 in this embodiment, and the adhesive injection hole 120 communicates with a bearing mounting hole 113 of the bearing mounting portion 112, for injecting an adhesive into the bearing mounting hole 113.

A motor mounting portion 118 is arranged on the side of the bracket body 11 close to the casing 1 in this embodiment, and the body of the motor 1000 and the bracket body 11 are fixedly connected by the motor mounting portion 118.

Specifically, the motor mounting portion 118 is a motor mounting hole, and a bolt hole corresponding to the motor mounting hole is provided on the casing 1 of the motor 1000. A fastener is passed through the motor mounting hole and tightened in the bolt hole on the casing 1, to connect the bracket body 11 to the casing 1.

A brake mounting portion 117 is arranged on the side of the bracket body 11 close to the casing 1 in this embodiment, and a brake and the bracket body 11 are fixedly connected by the brake mounting portion 117.

Specifically, the brake mounting portion 117 is a brake mounting hole, and a fastener is passed through the brake and tightened in the brake mounting hole, to connect the bracket body 11 to the brake.

Embodiment 22

This embodiment is a further limitation on at least one of Embodiments 7 to 10.

At least one adhesive injection hole 120 for adhesive injection is provided on the bottom plate 110 in this embodiment, and the adhesive injection hole 120 communicates with a bearing mounting hole 113 of the bearing mounting portion 112, for injecting an adhesive into the bearing mounting hole 113.

Specifically, the adhesive injection hole 120 is a through hole, one end of the adhesive injection hole 120 communicates with the bearing mounting hole 113, and the other end of the adhesive injection hole 120 extends to a side of the bottom plate 110 close to the protective cover 12, to inject adhesive to the bearing mounting hole 113 on the side of the bottom plate 110 close to the protective cover 12.

A motor mounting portion 118 is arranged on the side of the bracket body 11 close to the casing 1 in this embodiment, and the body of the motor 1000 and the bracket body 11 are fixedly connected by the motor mounting portion 118.

Specifically, the motor mounting portion 118 is a motor mounting hole, and a bolt hole corresponding to the motor mounting hole is provided on the casing 1 of the motor 1000. A fastener is passed through the motor mounting hole and tightened in the bolt hole on the casing 1, to connect the bracket body 11 to the casing 1.

Embodiment 23

This embodiment is a further limitation on at least one of Embodiments 7 to 10.

At least one adhesive injection hole 120 for adhesive injection is provided on the bottom plate 110 in this embodiment, and the adhesive injection hole 120 communicates with a bearing mounting hole 113 of the bearing mounting portion 112, for injecting an adhesive into the bearing mounting hole 113.

A brake mounting portion 117 is arranged on the side of the bracket body 11 close to the casing 1 in this embodiment, and a brake and the bracket body 11 are fixedly connected by the brake mounting portion 117.

Specifically, the brake mounting portion 117 is a brake mounting hole, and a fastener is passed through the brake and tightened in the brake mounting hole, to connect the bracket body 11 to the brake.

Embodiment 24

This embodiment is a further limitation on at least one of Embodiments 7 to 10.

A motor mounting portion 118 is arranged on the side of the bracket body 11 close to the casing 1 in this embodiment, and the body of the motor 1000 and the bracket body 11 are fixedly connected by the motor mounting portion 118.

Specifically, the motor mounting portion 118 is a motor mounting hole, and a bolt hole corresponding to the motor mounting hole is provided on the casing 1 of the motor 1000. A fastener is passed through the motor mounting hole and tightened in the bolt hole on the casing 1, to connect the bracket body 11 to the casing 1.

A brake mounting portion 117 is arranged on the side of the bracket body 11 close to the casing 1 in this embodiment, and a brake and the bracket body 11 are fixedly connected by the brake mounting portion 117.

Specifically, the brake mounting portion 117 is a brake mounting hole, and a fastener is passed through the brake and tightened in the brake mounting hole, to connect the bracket body 11 to the brake.

Embodiment 25

This embodiment is a further limitation on Embodiment 8. In this embodiment, at least one groove 115 is provided on a surface of a side of the bottom plate 110 away from the protective cover 12, where the at least one groove 115 is between the bearing mounting portion 112 and an outer circumferential surface of the bottom plate 110.

Specifically, the bearing mounting portion 112 is an annular flange protruding toward a side of the bottom plate 110 close to the casing 1, and a groove 115 is provided on the bottom plate 110. The groove 115 is located at a region between the side wall portion 114 and the bearing mounting portion 112, and an opening of the groove 115 faces toward a side away from the protective cover 12.

Preferably, there are a plurality of grooves 115, and the plurality of grooves 115 are circumferentially spaced apart on the bottom plate 110.

Optionally, the groove 115 is provided on a side of the bracket body 11 facing toward the casing 1 of the motor 1000.

Optionally, the groove 115 can be alternatively provided on a side of the bracket body 11 away from the casing 1 of the motor 1000.

Optionally, a combination of orthographic projections of the groove 115 and the placement groove 122 on a plane perpendicular to the axis of the motor 1000 is annular or discontinuously annular.

Optionally, both the groove 115 and the placement groove 122 extend along an arc-shaped track, and the orthographic projections of the groove 115 and the placement groove 122 on a plane perpendicular to a shaft of the motor are on the same arc track.

Optionally, a radial cross-section of the groove 115 is circular or polygonal. The radial cross-section refers to a cross-section of the groove 115 taken by a plane perpendicular to the axis of the motor 1000. The radial cross-section of the groove 115 may be any polygon in structure such as a triangle or a rectangle or a pentagon.

Optionally, an end surface at a side of the bracket body 11 away from the casing 1 of the motor 1000 is a first end surface, and an end surface at a side of the bracket body 11 close to the casing 1 of the motor 1000 is a second end surface, where the opening of the groove 115 and an opening end of the bearing mounting portion 112 face toward the direction close to the casing 1, and a height from the bottom surface of the groove 115 to the first end surface is less than or equal to a height from the bottom surface of the bearing mounting portion 112 to the first end surface; or the opening of the groove 115 is away from the direction of the rear end of the casing, and the opening end of the bearing mounting portion 112 faces toward the direction close to the casing 1, where a shortest distance from the bottom surface of the groove 115 to the second end surface is less than or equal to a shortest distance from the bottom surface of bearing mounting portion 112 to the second end surface. The bearing mounting portion 112 has a groove structure, and the bottom surface of the bearing mounting portion 112 is a groove bottom surface of the groove structure. By limiting a depth of the groove 115, the foregoing arrangement makes the groove 115 have a weight-reducing effect without damaging the overall structural strength of the bracket body 11.

Embodiment 26

This embodiment is a further limitation on Embodiment 1. The bearing mounting portion 112 in this embodiment includes: a bearing mounting hole 113 and an adhesive storage groove 124, where the adhesive storage groove 124 is located on an inner side wall of the bearing mounting hole 113.

Figure 8:
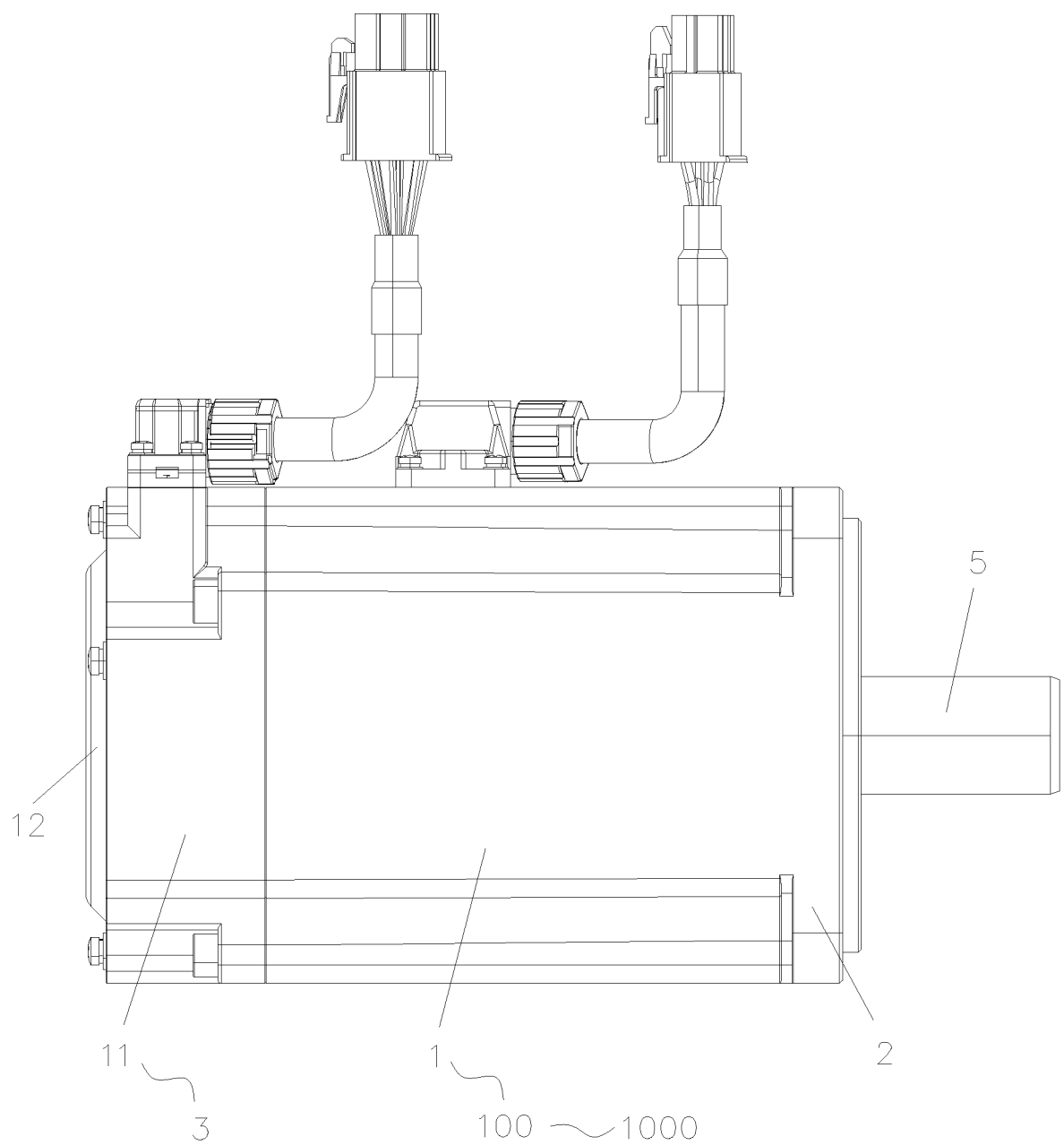
FIG. 8 is a front view of a motor including the bracket body shown in FIG. 1.
Figure 9:
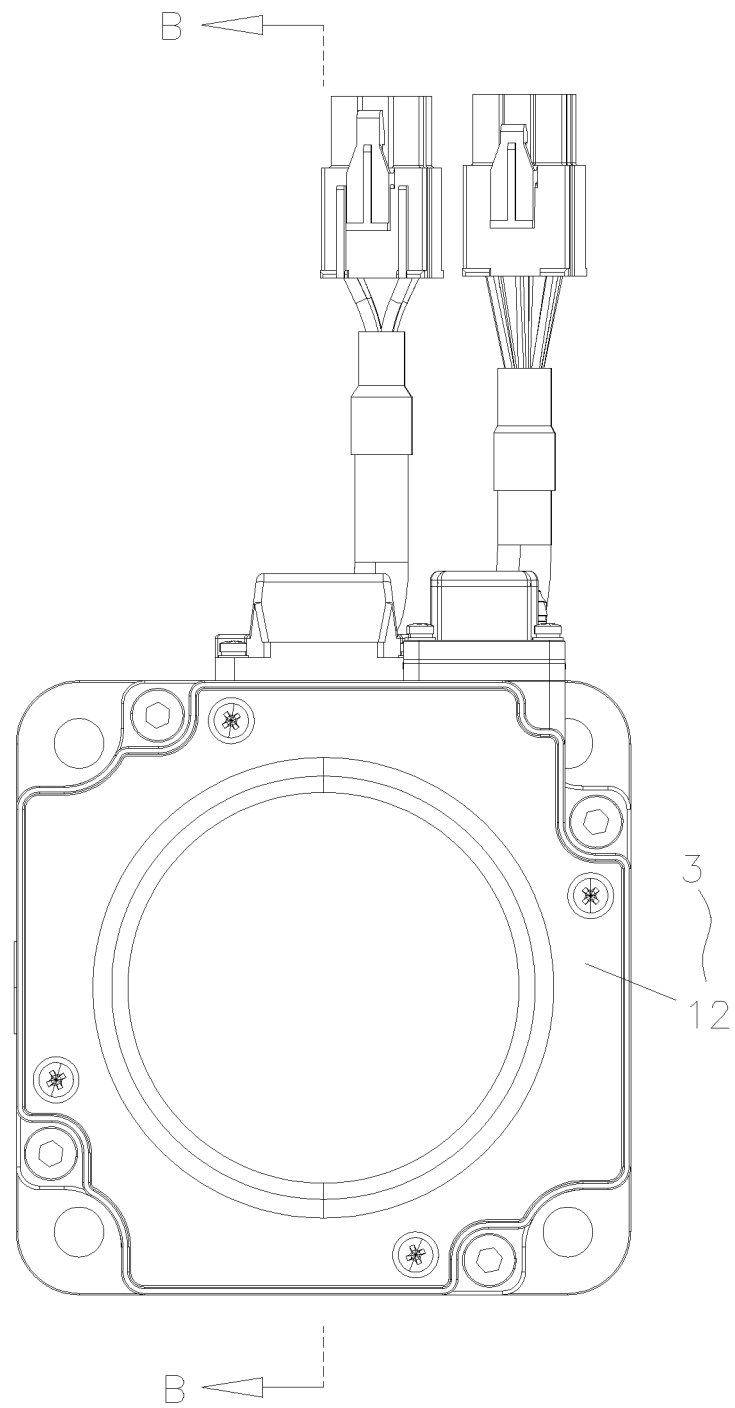
FIG. 9 is a side view of a motor including the bracket body shown in FIG. 8.
Figure 10:
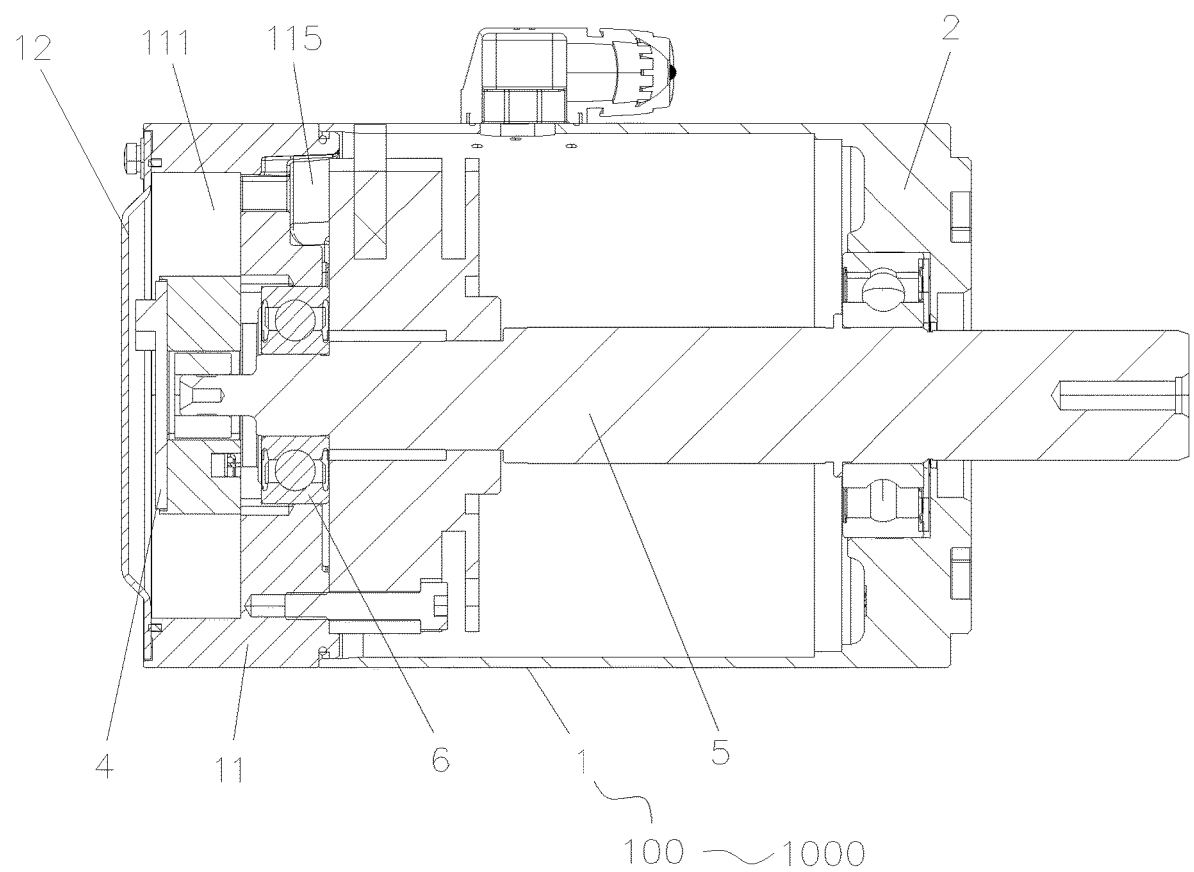
FIG. 10 is a cross-sectional view of a motor including the bracket body shown in FIG. 9 along a B-B direction.

As shown in FIG. 8 to FIG. 10, the present disclosure further provides a motor, including: a casing 1 and a front end cover 2 and a mounting bracket 3 respectively located at two opposing ends of the casing 1, where the mounting bracket 3 is the foregoing mounting bracket; and where the casing 1 and the front end cover 2 are integrally formed or detachably connected.

Specifically, the motor in the present disclosure is a servo motor, and the casing 1, the front end cover 2, and the mounting bracket 3 jointly constitute a casing assembly 100 of the motor 1000.

In a first embodiment of the motor in the present disclosure, the casing 1 is integrally formed with both the front end cover 2 and the mounting bracket 3.

In a second embodiment of the motor in the present disclosure, the casing 1 and the front end cover 2 are integrally formed, and the casing 1 and the mounting bracket 3 are detachably connected.

In a third embodiment of the motor in the present disclosure, the casing 1 and the front end cover 2 are detachably connected, and the casing 1 and the mounting bracket 3 are integrally formed.

In a fourth embodiment of the motor in the present disclosure, the casing 1 and the front end cover 2 are detachably connected, and the casing 1 and the mounting bracket 3 are detachably connected.

It can be learned from the foregoing description that the foregoing embodiments of the present disclosure all achieve the following technical effects:

The mounting bracket arranged on a side of the casing 1 of the motor 1000 away from the front end cover 2 in the present disclosure includes: a bracket body 11, where a bearing mounting portion 112 for mounting a bearing 6 of the motor 1000 is arranged on a side of the bracket body 11 close to the casing 1; and a protective cover 12 and at least one of a protective cover mounting portion 125 and an encoder bracket mounting portion are arranged on a side of the bracket body 11 away from the casing 1; and where the protective cover mounting portion 125 is configured to fixedly connect the bracket body 11 and the protective cover 12, so that an accommodation space 111 for accommodating an encoder 4 is defined between the bracket body 11 and the protective cover 12; or the encoder bracket mounting portion includes a first encoder bracket mounting portion, and the first encoder bracket mounting portion is fixedly connected to the protective cover 12 by an encoder bracket 41, so that the accommodation space 111 for accommodating the encoder 4 is defined between the encoder bracket 41 and the protective cover 12. In this way, by the arrangement of the mounting bracket, the bearing 6 of the motor 1000 can be mounted, and the encoder can be mounted in the accommodation space of the mounting bracket of the motor, thereby resolving the problems in the prior art that the encoder is mounted outside the rear end cover of the motor and protection for the encoder during mounting is weak, the overall volume of the motor is large, and motor costs are high.

It should be noted that the terms used herein are merely for describing specific implementations, and are not intended to limit exemplary implementations according to the present disclosure. As used herein, the singular form is intended to include the plural form, unless the context clearly indicates otherwise. In addition, it should further be understood that terms "comprise" and/or "include" used in this specification indicate that there are features, steps, operations, devices, components, and/or combinations thereof.

Unless otherwise specified, the relative deployment, the numerical expression, and values of the components and steps described in the embodiments do not limit the scope of the present disclosure. In addition, it should be understood that, for ease of description, sizes of parts shown in the accompanying drawings are not drawn according to an actual proportional relationship. Technologies, methods, and devices known to a person of ordinary skill in the art may not be discussed in detail, but in proper circumstances, the technologies, methods, and devices shall be regarded as a part of the specification. In all examples that are shown and discussed herein, any specific value should be interpreted only as an example and not as a constraint. Therefore, other examples of the exemplary embodiments may have different values. It should be noted that: similar reference signs or letters in the accompanying drawings indicate similar items. Therefore, once an item is defined in one accompanying drawing, the item does not need to be further discussed in the subsequent accompanying drawings.

In the description of the present disclosure, it should be understood that orientation or position relationships indicated by orientation terms such as "front, rear, upper, lower, left, and right", "transverse, vertical, perpendicular, and horizontal", and "top and bottom" are usually based on orientation or position relationships shown in the accompanying drawings, and are used only for ease and brevity of illustration and description of the present disclosure. Unless otherwise stated, the orientation terms do not indicate or imply that the mentioned apparatus or element needs to have a particular orientation or needs to be constructed and operated in a particular orientation. Therefore, such terms should not be construed as limiting of the protection scope of the present disclosure. The orientation terms such as "inside and outside" refer to the inside and outside of outlines of the components.

For ease of description, space-related terms, such as "over", "above", "on the upper surface", and "upper", may be used herein for describing a spatial location relationship between one device or feature and another device or feature as shown in the drawings. It should be understood that, the space-related terms are intended to encompass different orientations of the device in use or operation other than the orientations described in the drawings. For example, if the devices in the accompanying drawings are reversed, the devices that are described as "above another device or structure" or "on another device or structure" are subsequently defined as "below another device or structure" or "under another device or structure". Therefore, the exemplary term "above" may include two orientations: "above" and "below". The device may alternatively be positioned in other different manners (rotating by 90 degrees or being located at other orientations), and space-related descriptions used herein are explained accordingly.

In addition, it should be noted that, the terms such as "first", and "second" are used to define parts only to make it easier to distinguish the corresponding parts. Unless otherwise stated, the terms have no special meanings, and therefore cannot be construed as limiting the protection scope of the present disclosure.

The above descriptions are merely exemplary embodiments of the present disclosure and are not intended to limit the present disclosure. A person skilled in the art may make various alterations and variations to the present disclosure. Any modification, equivalent replacement, or improvement and the like made within the spirit and principle of the present disclosure shall fall within the protection scope of the present disclosure.

What is claimed is:

1. A mounting bracket, arranged on a side of a casing (1) of a motor (1000) away from a front end cover (2), the mounting bracket comprising:
   a bracket body (11) comprises a bottom plate (110), wherein
   a bearing mounting portion (112) for mounting a bearing (6) of the motor (1000) is arranged on
   a side of the bracket body (11) close to the casing (1); and
   a protective cover (12) and at least one of a protective cover mounting portion (125) and an encoder bracket mounting portion are arranged on a side of the bracket body (11) away from the casing (1); and
   wherein the protective cover mounting portion (125) is configured to fixedly connect the bracket body (11) and the protective cover (12), so that an accommodation space (111) for accommodating an encoder (4) is defined between the bracket body (11) and the protective cover (12); or
   the encoder bracket mounting portion comprises a first encoder bracket mounting portion, and the first encoder bracket mounting portion is fixedly connected to the protective cover (12) by an encoder bracket (41), so that the accommodation space (111) for accommodating the encoder (4) is defined between the encoder bracket (41) and the protective cover (12); and
   a placement groove (122) for placing a cable of a brake of the motor (1000) is provided on a side of the bottom plate (110) close to the protective cover (12); and
   a second through hole (123) is provided on the bottom plate (110), wherein the second through hole (123) is spaced apart from the placement groove (122), or the second through hole (123) communicates with the placement groove (122), and a part of the cable of the brake of the motor (1000) is passed through the second through hole (123) and placed in the placement groove (122).

2. The mounting bracket according to claim 1, wherein the accommodation space (111) comprises:
   a first accommodation cavity, wherein the first accommodation cavity is provided on the bracket body (11) and located on a side of the bracket body (11) close to the protective cover (12), and an opening of the first accommodation cavity faces toward the protective cover (12); or
   a second accommodation cavity, wherein the second accommodation cavity is provided on the protective cover (12) and located on a side of the protective cover (12) close to the bracket body (11), and an opening of the second accommodation cavity faces toward the bracket body (11); or
   a third accommodation cavity, wherein the third accommodation cavity is provided on the encoder bracket (41) and located on a side of the encoder bracket (41) close to the protective cover (12), and an opening of the third accommodation cavity faces toward the protective cover (12); or
   a fourth accommodation cavity, wherein the fourth accommodation cavity is provided on the protective cover (12) and located on a side of the protective cover (12) close to the encoder bracket (41), and an opening of the fourth accommodation cavity faces toward the encoder bracket (41).

3. The mounting bracket according to claim 1, wherein the bracket body (11) comprises a side wall portion (114) at least partially surrounding the bottom plate (110), and the bottom plate (110) is perpendicular to an axis of the motor (1000), wherein a height L1 of the side wall portion (114) between the bottom plate (110) and the protective cover (12) is greater than 0, and/or a height L2 of the side wall portion (114) between the casing (1) and the bottom plate (110) is greater than or equal to 0.

4. The mounting bracket according to claim 1, wherein the encoder bracket (41) is arranged on the bottom plate (110), and
   the encoder bracket (41) and the bottom plate (110) are integrally formed; or
   a second encoder bracket mounting portion (121) is arranged on the bottom plate (110), and the encoder bracket (41) and the bottom plate (110) are detachably connected by the second encoder bracket mounting portion (121).

5. The mounting bracket according to claim 1, wherein at least one first through hole (119) is provided on the side wall portion (114), and a center line of the at least one first through hole (119) is perpendicular to the axis of the motor (1000), and/or the first through hole (119) faces toward a mounting hole on a side wall of the encoder bracket (41) to communicate with the mounting hole, for leading out a cable of the motor (1000) or fastening the encoder (4) or adjusting the encoder (4).

6. The mounting bracket according to claim 1, wherein the second through hole (123) runs through the bottom plate (110), the second through hole (123) is provided close to the side wall portion (114), and the second through hole (123) is configured for at least one of an encoder cable, a winding cable, or a brake cable to pass through.

7. The mounting bracket according to claim 1, wherein
at least one adhesive injection hole (120) for adhesive injection is provided on the bottom plate (110), and the adhesive injection hole (120) communicates with a bearing mounting hole (113) of the bearing mounting portion (112), for injecting an adhesive into the bearing mounting hole (113); and/or a motor mounting portion (118) is arranged on the side of the bracket body (11) close to the casing (1), and the body of the motor (1000) and the bracket body (11) are fixedly connected by the motor mounting portion (118); and/or a brake mounting portion (117) is arranged on the side of the bracket body (11) close to the casing (1), and a brake and the bracket body (11) are fixedly connected by the brake mounting portion (117).

8. The mounting bracket according to claim 1, wherein at least one groove (115) is provided on a surface of a side of the bottom plate (110) away from the protective cover (12), wherein the at least one groove (115) is between the bearing mounting portion (112) and an outer circumferential surface of the bottom plate (110).

9. The mounting bracket according to claim 1, wherein the bearing mounting portion (112) comprises:
a bearing mounting hole (113) and an adhesive storage groove (124), wherein the adhesive storage groove (124) is located on an inner side wall of the bearing mounting hole (113).

10. A motor, comprising:
a casing (1) and a front end cover (2) and a mounting bracket (3) of claim 1 respectively located at two opposing ends of the casing (1);
wherein the casing (1) and the front end cover (2) are integrally formed or detachably connected.

* * * * *